US009221705B2

(12) United States Patent
Langsdorf et al.

(10) Patent No.: US 9,221,705 B2
(45) Date of Patent: Dec. 29, 2015

(54) METHOD FOR MANUFACTURING MOLDED GLASS ARTICLES, AND USE OF THE GLASS ARTICLES MANUFACTURED ACCORDING TO THE METHOD

(75) Inventors: Andreas Langsdorf, Ingelheim (DE); Bernd Hoppe, Ingelheim (DE); Ulrich Lange, Mainz (DE)

(73) Assignee: SCHOTT AG, Mainz (DE)

( * ) Notice: Subject to any disclaimer, the term of this patent is extended or adjusted under 35 U.S.C. 154(b) by 255 days.

(21) Appl. No.: 13/697,504

(22) PCT Filed: Apr. 28, 2011

(86) PCT No.: PCT/EP2011/056724
§ 371 (c)(1),
(2), (4) Date: Jul. 2, 2013

(87) PCT Pub. No.: WO2011/141295
PCT Pub. Date: Nov. 17, 2011

(65) Prior Publication Data
US 2013/0298608 A1    Nov. 14, 2013

(30) Foreign Application Priority Data

May 12, 2010    (DE) .......................... 10 2010 020 439

(51) Int. Cl.
*C03B 23/02*    (2006.01)
*C03B 23/025*    (2006.01)
*C03B 23/03*    (2006.01)
*C03B 23/035*    (2006.01)
*C03B 23/037*    (2006.01)
*C03B 23/20*    (2006.01)
*C03B 23/26*    (2006.01)

(52) U.S. Cl.
CPC ........... *C03B 23/0258* (2013.01); *C03B 23/035* (2013.01); *C03B 23/037* (2013.01); *C03B 23/0352* (2013.01); *C03B 23/0355* (2013.01); *C03B 23/0357* (2013.01); *C03B 23/20* (2013.01); *C03B 23/26* (2013.01)

(58) Field of Classification Search
None
See application file for complete search history.

(56) References Cited

U.S. PATENT DOCUMENTS

| 4,173,461 | A | * | 11/1979 | Ebata et al. ..................... 65/106 |
| 5,594,999 | A | * | 1/1997 | Best ................................. 34/270 |
| 6,505,483 | B1 | * | 1/2003 | Hoetzl et al. ................... 65/25.2 |
| 7,000,430 | B1 | * | 2/2006 | Fotheringham et al. ....... 65/33.2 |
| 2002/0020192 | A1 | * | 2/2002 | Bader et al. ..................... 65/33.1 |
| 2004/0079112 | A1 | * | 4/2004 | Inoue et al. ................... 65/29.11 |
| 2004/0107731 | A1 | * | 6/2004 | Doehring et al. ................. 65/81 |
| 2010/0000259 | A1 | * | 1/2010 | Ukrainczyk et al. ............ 65/104 |
| 2010/0050694 | A1 | * | 3/2010 | Dajoux et al. .................. 65/106 |

FOREIGN PATENT DOCUMENTS

| DE | 29905385 | 8/2000 |
| GB | 2320021 | 6/1998 |
| WO | 00/56674 | 9/2000 |

OTHER PUBLICATIONS

International Search Report dated Oct. 6, 2011 corresponding to International Patent Application No. PCT/EP2011/056724.

* cited by examiner

*Primary Examiner* — Lisa Herring
(74) *Attorney, Agent, or Firm* — Ohlandt, Greeley, Ruggiero & Perle, LLP

(57) ABSTRACT

Processes for producing shaped glass articles with a defined geometry are provided. In some embodiment, the process includes arranging a glass pane on a mould, heating the glass pane by infrared radiation, deforming the heated glass pane over the mould by gravity, negative pressure, and/or positive pressure, and cooling the shaped glass pane to obtain the shaped glass article with a defined geometry.

20 Claims, 17 Drawing Sheets

Figure 3:
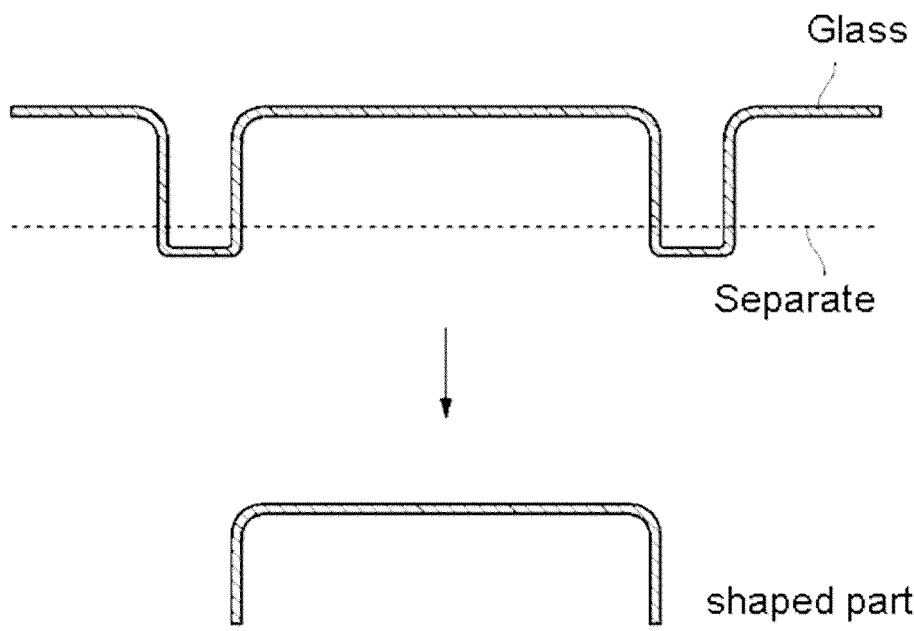

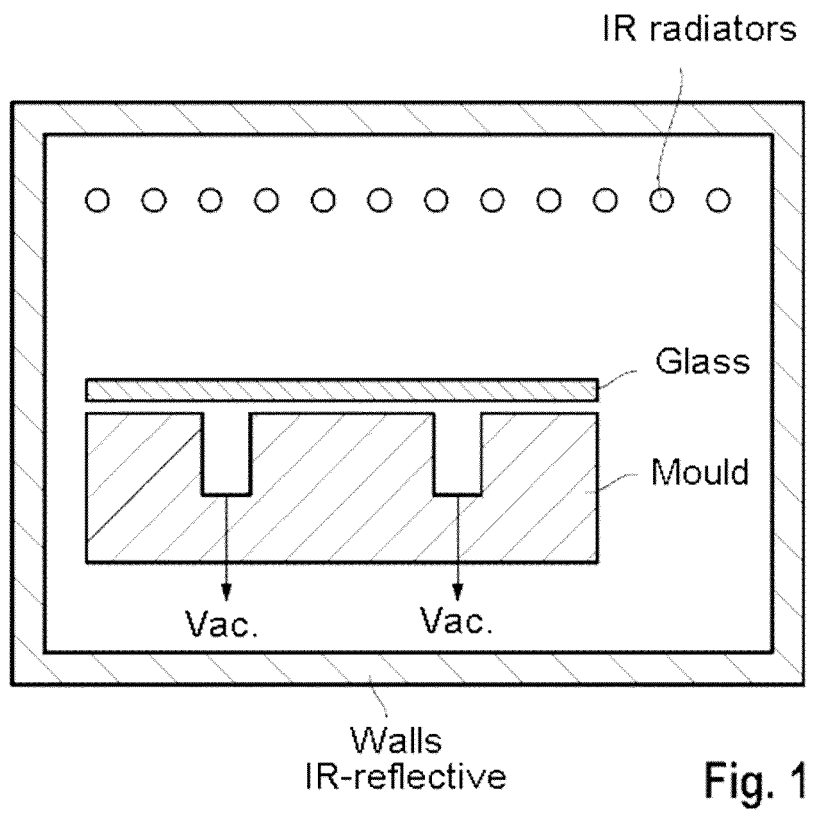
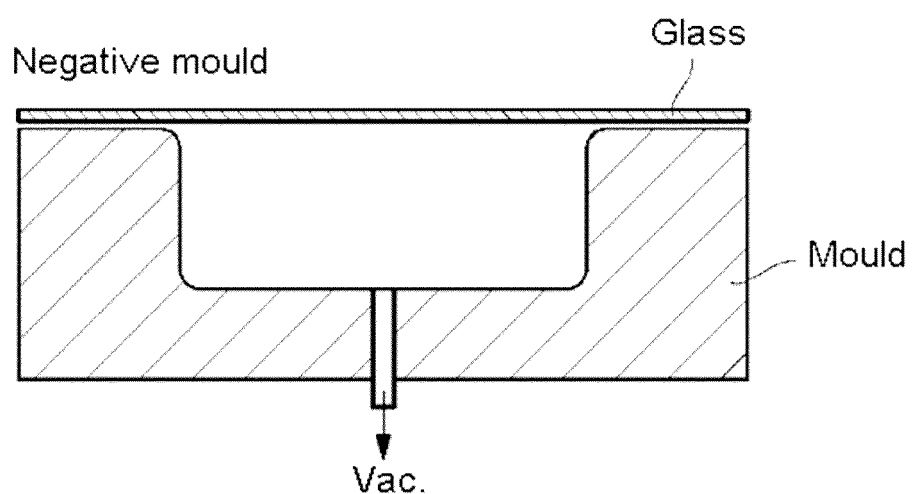
Fig. 1

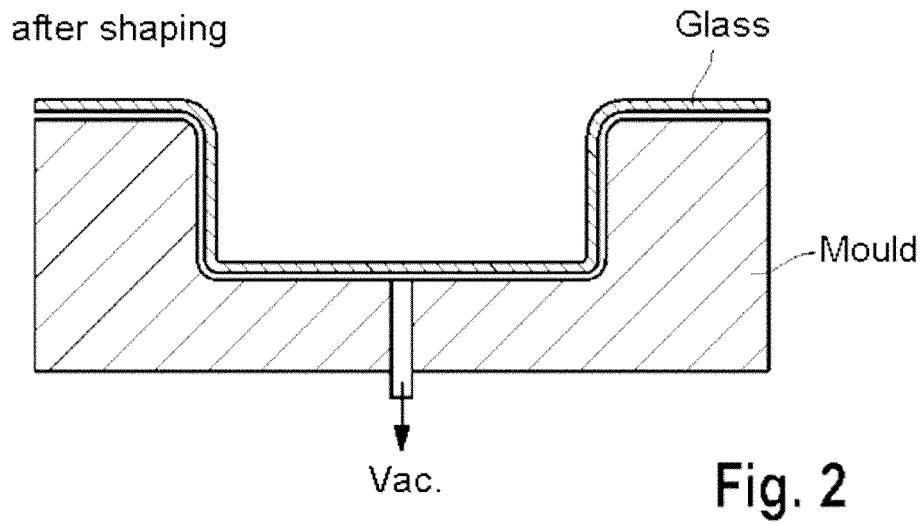
Fig. 2
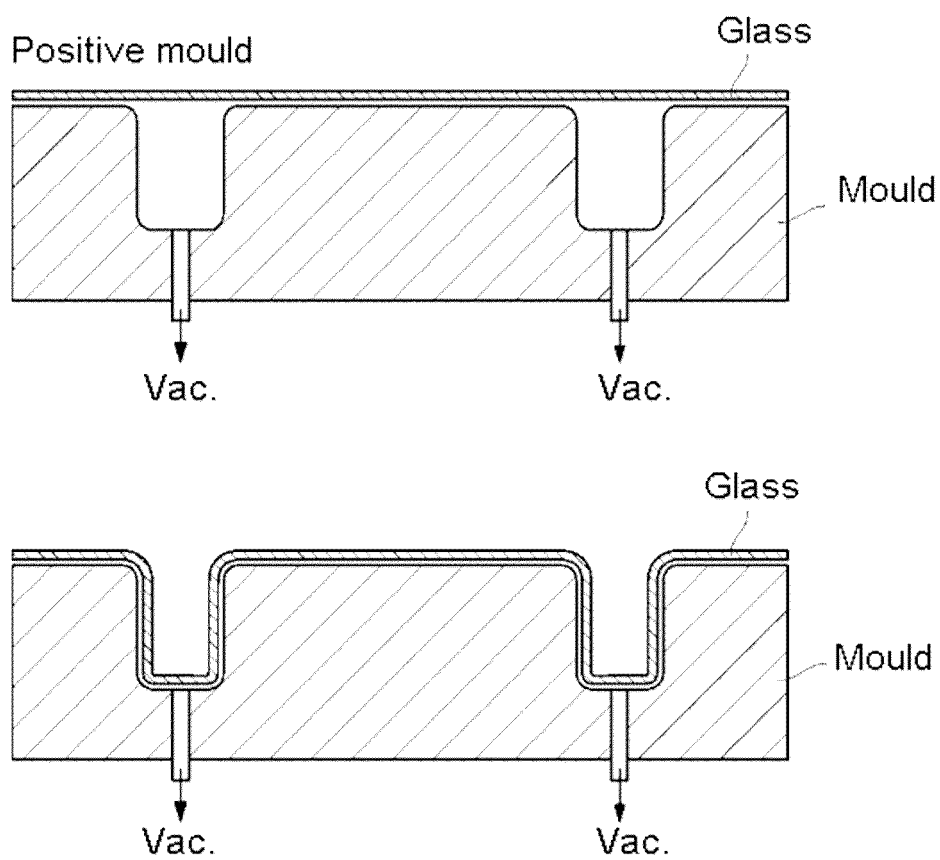

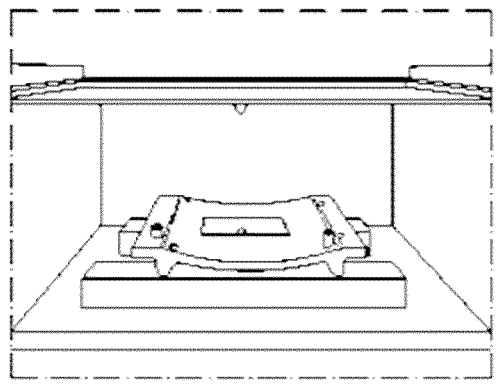
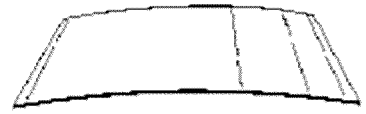
Fig. 9a

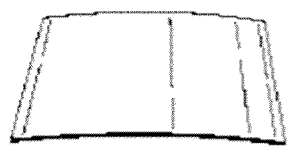
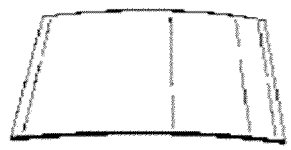
Fig. 9b

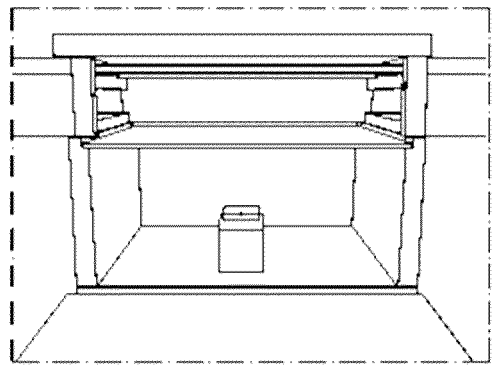
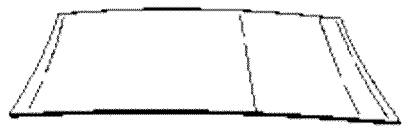
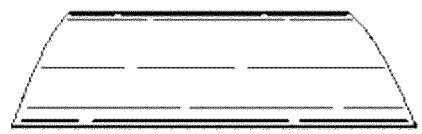
Fig. 10a

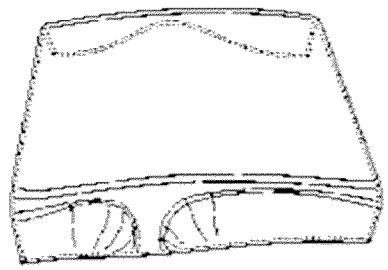
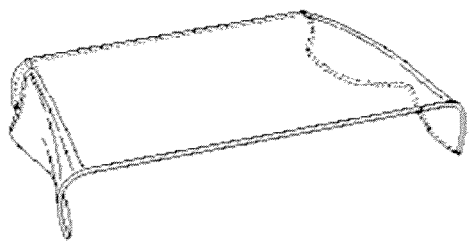
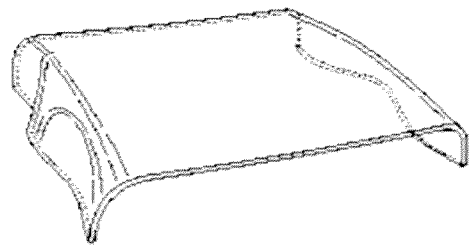
Fig. 10b

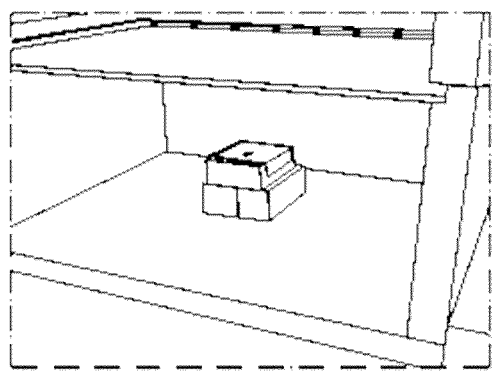
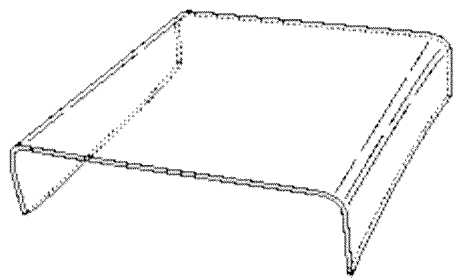
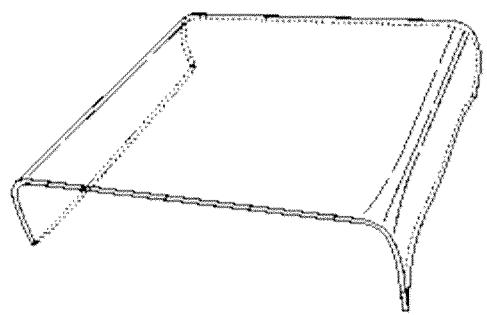
Fig. 11

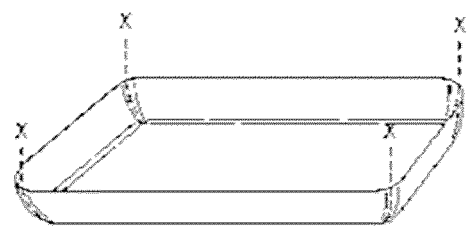
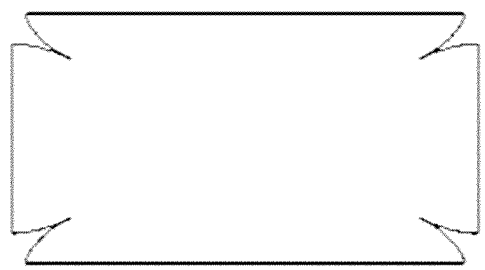
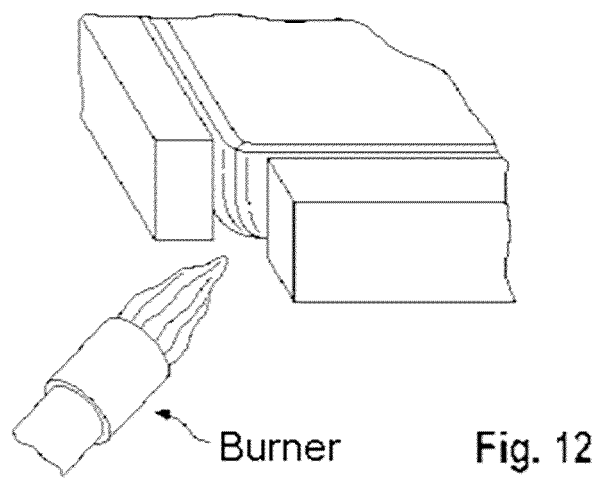
Burner    Fig. 12

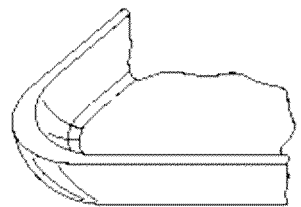
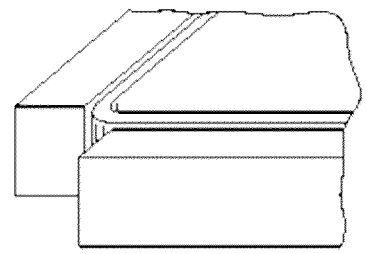
Fig. 16
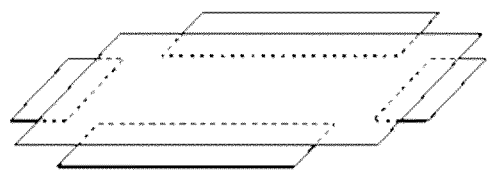
Fig. 17a
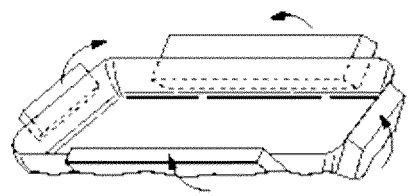
Fig. 17b

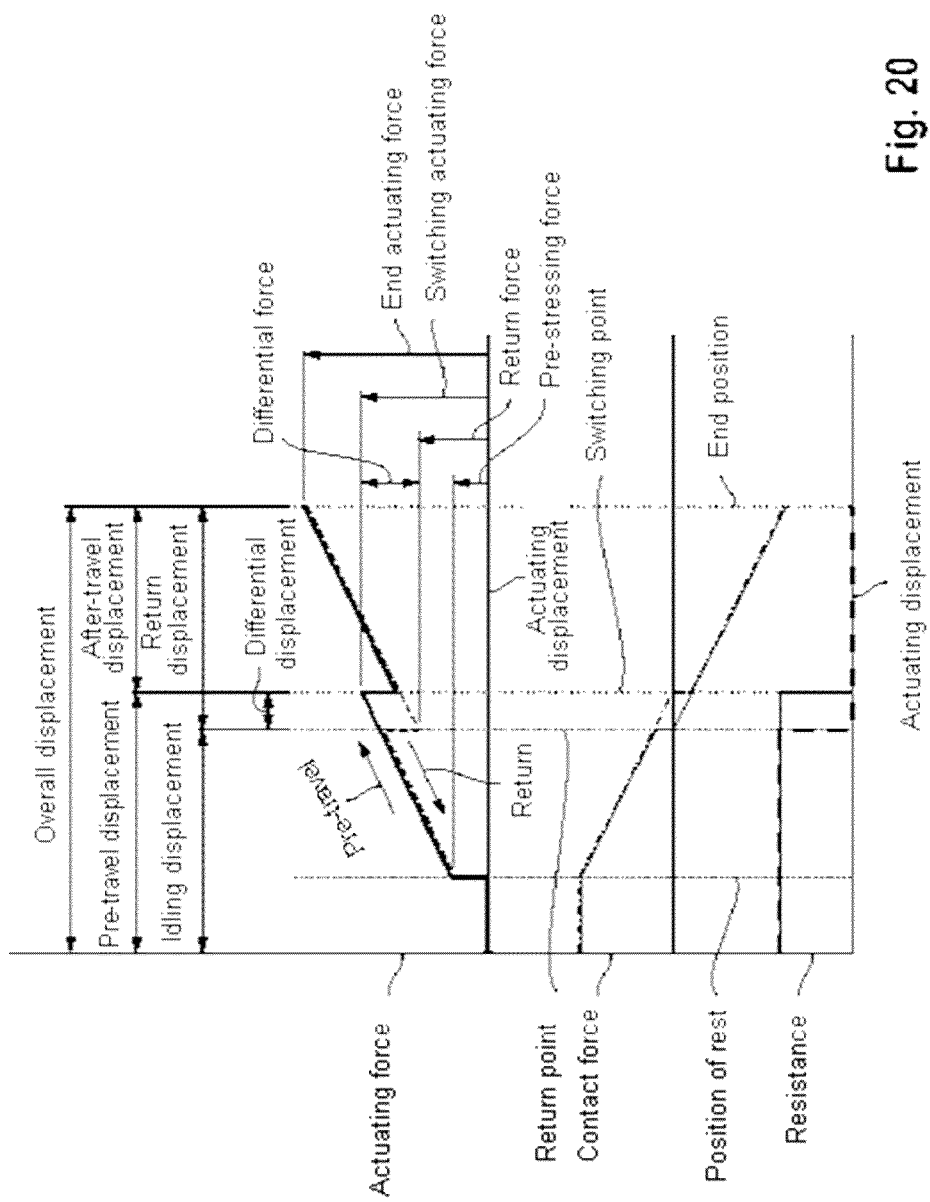

METHOD FOR MANUFACTURING MOLDED GLASS ARTICLES, AND USE OF THE GLASS ARTICLES MANUFACTURED ACCORDING TO THE METHOD

The invention relates to processes for producing shaped glass articles with a defined geometry and also to the use of glass articles produced by the processes.

US 2010/0000259 A1 substantially describes the bending of glasses, preferably with the use of medium-wave IR radiation which is preferably absorbed in the glass.

It is an object of the invention to find processes for producing shaped glass articles with a defined geometry. Furthermore, it is an object of the invention to specify the use of the glass articles produced by the processes according to the invention. The glass articles produced by the processes should have narrow radii—even three-dimensional—with a high surface quality, without deep folds or undulations.

This object is achieved by means of the following six processes (processes 1 to 6) according to Claims 1 to 11.

A process 1 for producing shaped glass articles with a defined geometry, wherein the process comprises at least the following steps:
a glass pane is arranged on a mould,
the glass pane is heated by means of infrared radiation, in particular by means of short-wave or by means of medium-wave infrared radiation, in a heating unit,
the heated glass pane is deformed over the mould by means of the external action of force, in particular by means of gravity, by means of negative pressure and/or by means of excess pressure,
the shaped glass pane is cooled so as to obtain the shaped glass article with a defined geometry.

A process 2 for producing shaped glass articles with a defined geometry, wherein the process comprises at least the following steps:
a glass pane is arranged in relation to at least one mould,
the glass pane is heated by means of infrared radiation, in particular by means of short-wave or by means of medium-wave infrared radiation, in a heating unit,
the heated glass pane is deformed by means of the external action of force, in particular by means of gravity, by means of negative pressure and/or by means of excess pressure, wherein the glass pane at least partially follows a contour of the mould,
the shaped glass pane is cooled so as to obtain the shaped glass article with a defined geometry.

The heating unit according to process 1 or 2 preferably has at least one inner wall, which is heated to a temperature which is higher than the temperature of the heated glass pane.

A process 3 for producing shaped glass articles with a defined geometry, wherein the process comprises at least the following steps:
a glass pane is trimmed to a predefined contour,
the glass pane is heated or at least the partial regions of the glass pane to be deformed are heated,
the heated glass pane or at least the heated partial regions of the glass pane are deformed by means of bending so as to obtain abutting edges,
the abutting edges are melted,
the shaped glass pane is cooled so as to obtain the shaped glass article with a defined geometry.

The glass pane to be deformed according to processes 1, 2 or 3 preferably has a predefined thickness distribution.

According to processes 1, 2 or 3, the glass pane is preferably heated homogeneously or heterogeneously.

A process 4 for producing shaped glass articles with a defined geometry, wherein the process comprises at least the following steps:
a glass parison is provided,
the glass parison is introduced into at least one mould,
the glass parison is blown into the mould,
the shaped glass parison is cooled so as to obtain the shaped glass article with a defined geometry.

According to process 4, the mould preferably contains at least two wall regions which correspond positively or negatively to a desired contour of the glass article, and the glass articles are obtained by subsequent separation.

A process 5 for producing shaped glass articles with a defined geometry, wherein the process comprises at least the following steps:
a glass pane is provided,
individual, predefined regions of the glass pane are chemically tempered and/or thermally tempered so as to obtain the shaped glass article with a defined geometry.

According to processes 1 to 5, glass articles having narrow radii are preferably obtained, in particular having radii <50 mm, preferably <15 mm, and glass articles having a high surface quality are preferably obtained, in particular a surface with less than 1 defect measuring greater than 50 µm per 1 $cm^2$ in the shaped region, preferably less than 1 defect measuring greater than 50 µm per 10 $cm^2$, particularly preferably less than 1 defect measuring greater than 50 µm per 100 $cm^2$.

Glass articles produced by processes 1 to 5 preferably have folds and/or surface undulations which account for at most +/−10%, in particular at most +/−5%, of the thickness of the glass pane provided.

A process 6 for producing shaped glass articles with a defined geometry from and with ultrathin, transparent, chemically temperable glasses, wherein the process comprises at least the following steps:
a glass pane is arranged on a mould, the temperature of which is at least 50 K below the sticking point of the glass,
the glass pane is heated to deformation temperature by means of short-wave infrared radiation on a mould in a heating unit in less than 240 seconds,
the heated glass pane is deformed over the mould by means of gravity and/or by means of vacuum and/or by means of a plunger, wherein the heating remains active in all variants during the deformation and heats the glass pane further in a targeted manner or at least partially compensates for the heat loss owing to contact with the mould,
the shaped glass pane is cooled so as to obtain the shaped glass article with a defined geometry, and therefore the residual stresses remain below a critical level.

According to claim 12, the glass articles produced according to processes 1 to 5 can be used as part of a screen, part of a housing, in particular part of a housing of electrical or of electronic appliances, of mobile telephones, of computers or of games consoles.

Exemplary Embodiments I. to VI.

I. Processes 1 and 2 (Infrared Deformation)

Prior Art:

As a rule of thumb, it holds true in the case of conventional heating using electrical heating elements (heater temperature up to 1200° C.=max. 1500 K=long- and medium-wave IR radiators) that about 1 min is required per 1 mm glass thickness and 100 K temperature increase to achieve a desired target temperature. That is to say, 2 min are required to make glass having a thickness of 1 mm hotter by 200 K. That is to say, the time of 4 min as required according to US 2010/0000259 A1 is very slow. In addition, it is not disclosed how a furnace might appear and which thermal conditions prevail therein. If, as shown in US 2010/0000259 A1, the glass is positioned in a furnace chamber containing medium-wave IR radiators (which themselves can stand in a tightly packed manner) at a distance of up to 50 cm from the glass, it is very difficult to achieve the heating rates indicated, since the power densities in such radiators cannot lie above 50 kW/m² of heating surface.

An improvement according to the invention, which goes beyond the disclosure of US 2010/0000259 A1, is that of preferably using a furnace chamber closed on all sides, in order to utilize more energy and to thereby increase the heating rate.

US 2010/0000259 A1 merely deals with medium-wave IR radiators from Heraeus Noblelight. That is to say, the furnace walls do not have any additional heating and therefore remain much colder than the radiators, which are indicated as having a filament temperature of 800° C. to 900° C. The interior of the furnace therefore also remains cold; only the irradiated material is heated by the IR radiation. The furnace walls are by all means colder than the glass. It is therefore a preferred embodiment according to the invention to keep the furnace walls hotter than the glass, i.e. by preheating and good insulation of the furnace or by additional heating by conventional electrical heating elements. The furnace walls should be at least 100° C. hotter than the glass, better even hotter since the heating rate is increased as a result, i.e. the driving force for the heating (the temperature difference between the glass and the furnace wall).

In addition, it is advantageous to greatly preheat the furnace, if possible to a temperature above the target glass temperature, in order to achieve a high heating rate.

All of these measures also serve to keep the temperature of the mould low, since short glass heating times also mean only short intervals over which the mould can heat up.

Invention:

In order to effectively and very quickly heat glasses with small thicknesses and high transparency, e.g. lithium aluminium silicate glasses, soda-lime glasses, borosilicate glasses, alkali metal-free glasses, and the like, an appropriate level of IR power has to be provided. It is therefore necessary to use IR radiators with a short wavelength, since the IR power increases where $P \sim T^4$. That is to say, the following therefore holds true even for the medium-wave range where the glass absorbs a relatively large amount of IR radiation: the higher the radiator temperature, the higher the IR power. This also applies of course to the wavelength range of 2-4 μm, since the temperature-dependent intensity curves are always envelopes given solid-state thermal radiators. That is to say, the intensity of a defined wavelength is always higher in the case of a relatively high radiator temperature than in the case of a relatively low radiator temperature. Therefore, it is always advantageous for the heating rate to increase the IR radiator temperature.

In the case of very thin glasses having thicknesses of less than 4 mm, less than 3 mm, less than 2 mm, less than 1 mm, the surface/volume ratio increases continuously in the direction of the surface. That is to say, it becomes more and more difficult to achieve heating by means of IR radiation, since a majority of the irradiated energy is emitted again in the medium- and long-wave IR range via the surface at temperatures above 550° C. In the event of surface-absorbing irradiation, i.e. in the medium- and long-wave wavelength range of 2 μm and above, this is all the more critical, since it holds true that radiated emission capability=absorption capability (Kirchhoff). That is to say, long- and medium-wave IR radiators are not a solution since they irradiate only with a low power density and in the wavelength range where emission is preferably also carried out again. In this respect, short-wave radiators are much more suitable since, with these, much more IR radiation is provided in the medium-wave and long-wave range, owing to the high radiator temperature of more than 1500 K up to 3500 K, than can be emitted by the glass again via the surface, since the glass is much colder than 1500 K.

Heating by means of IR radiation is difficult in general and specifically so in the case of thin transparent glasses, since volume is scarcely available for absorption. Here, a remedy is provided only by multiple utilization of the IR radiation provided by a combination of high-energy short-wave IR radiators and highly IR-reflective walls of the heating unit, and a highly IR-reflective mould on which deformation is carried out. In this case, highly reflective means more than 50% of the IR radiation provided in the respective wavelength range of interest or else, integrally, over a defined wavelength range which is relevant for heating by means of the IR radiators used. In addition, the glass can be coloured in the near-IR range and/or medium- and/or long-wave IR range, in order to increase the IR absorption without excessive impairment of the visible range. This is so much the better the thinner the glass, since then a colouration is no longer apparent. This can be achieved, by way of example, by iron doping, ytterbium doping and other rare earth elements in the glass. An increased water (OH—) content in the glass also contributes to higher IR absorption and therefore an increased heating rate. The high heating rate is needed so as to keep the cycle times short and to keep the temperature difference between the mould and the glass as high as possible, although the minimum requirement is for the mould temperature to remain below the sticking point. This is dependent on viscosity and dependent on the glass contact material and is in the range of $10^{14}$ to $10^7$ dPas.

Here, the mould material used may be ceramic, e.g. $SiO_2$ ceramic (referred to as "Quarzal" hereinbelow), or aluminium oxide or spinel or similar IR-reflective ceramics. Also conceivable are metals having an IR-reflective coating, e.g. brass coated with gold, or base metals such as steel, aluminium, copper or the like, coated with silver, gold, platinum or similar IR-reflective metals or coated with IR-reflective ceramics. Highly IR-reflective metals can likewise be used as the mould material, e.g. gold, silver, platinum, platinum-gold alloys, aluminium or the like. Combinations of the materials mentioned above with one another are also conceivable.

Owing to the highly IR-reflective mould, a low mould temperature is also ensured, since the IR radiation which is not absorbed by the glass is not absorbed by the mould, which would lead to an increase in temperature, but instead is reflected, which leads to an increase in the temperature of the glass. In the case of shortened heating times, it is therefore possible at the same time to achieve a high temperature difference between the mould and the glass, even above 250 K. This contradicts the teaching of US 2010/0000259 A1.

At the same time, it is possible in this respect, owing to a very cold mould and very high glass temperatures (even above temperatures of the softening point), to achieve high degrees of deformation with very small radii, even less than 100 mm, less than 10 mm, less than 5 mm, less than 2 mm, together with very high surface qualities of the glass.

Therefore, irradiation is not performed here with preference in the wavelength range of 2 μm-4 μm, as per US 2010/0000259 A1, but instead over a much larger wavelength range of 250 nm-10 μm, and nevertheless it is possible to work with very cold moulds (in the range of 250° C.-800° C.) and very hot glasses (even above temperatures of the softening point).

For the first time, this procedure also makes it possible to deform very thin glasses having thicknesses of less than 4 mm, less than 3 mm, less than 2 mm, less than 1 mm with high degrees of deformation together with high surface qualities.

All known processes such as gravity sinking and vacuum sinking can be used as deformation processes. Here, in addition to negative moulds, i.e. the actual surface on the outside of the end product bears against the mould side, positive moulds are also possible for the first time. In this case, the surface on the outside of the end product does not make contact with the mould. In addition, vacuum thermoforming moulds are thus possible, which were otherwise not conceivable owing to the open geometry of the flat glass in the initial state. The figures which follow illustrate this:

FIG. 1: positive mould with a glass pane in the IR heating unit

FIG. 2: negative mould with a glass pane in the IR heating unit

FIG. 3: positive mould with a glass pane

Figure 4:
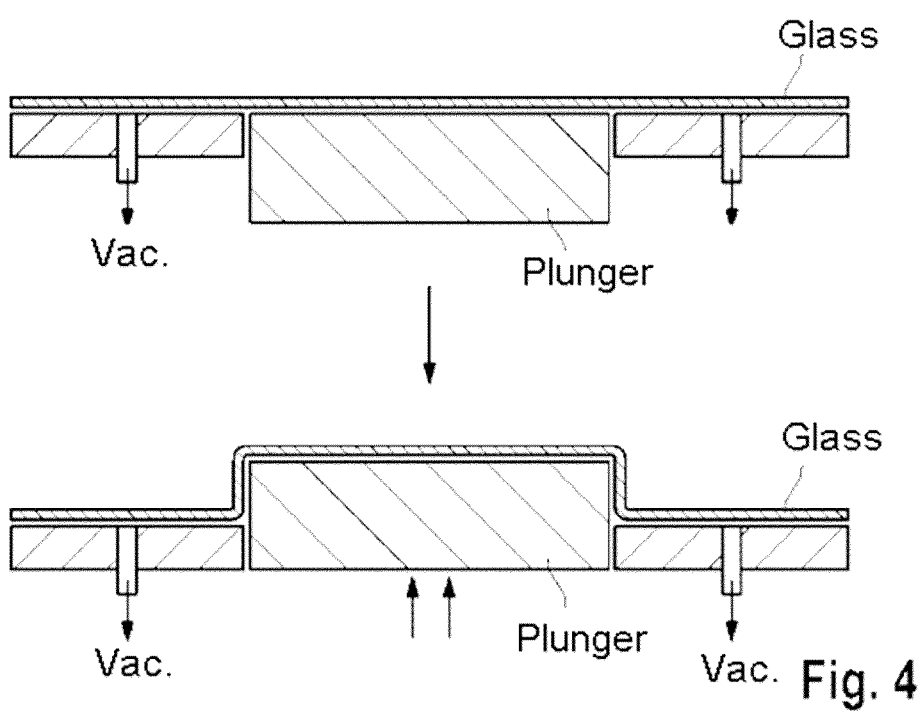

FIG. 4: plunger mould with a glass pane

Figure 5:
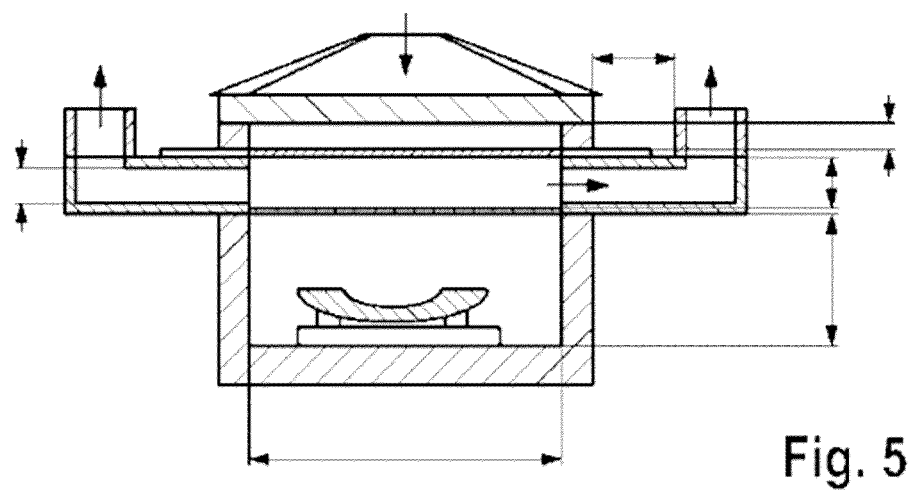

FIG. 5: SWIR heating unit with Quarzal walls

Figure 6:
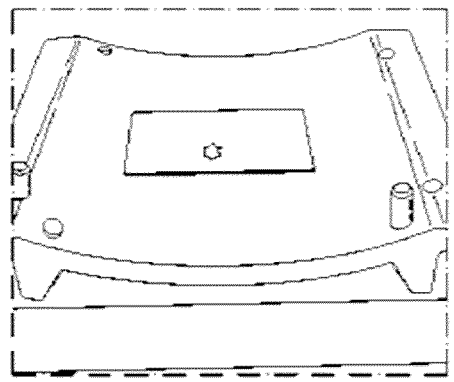

FIG. 6: glass pane on Quarzal

Figure 7:
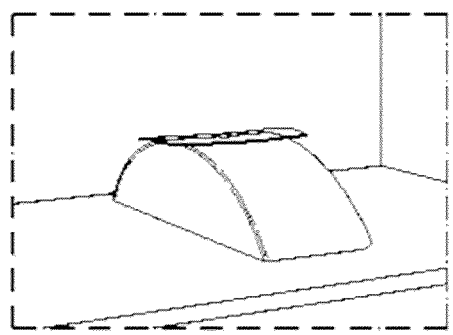

FIG. 7: glass pane on a Quarzal substrate

Figure 8:
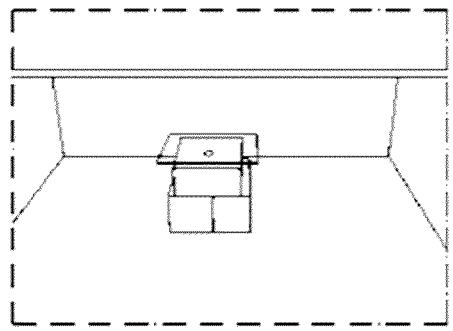

FIG. 8: glass pane on a Quarzal block

FIGS. 9 a/b: test series V01 to V04

FIGS. 10 a/b: test series V05 to V09

FIG. 11: test series V10 and V11

FIG. 12: scoring, folding and edge melting of a glass pane

Figure 13:
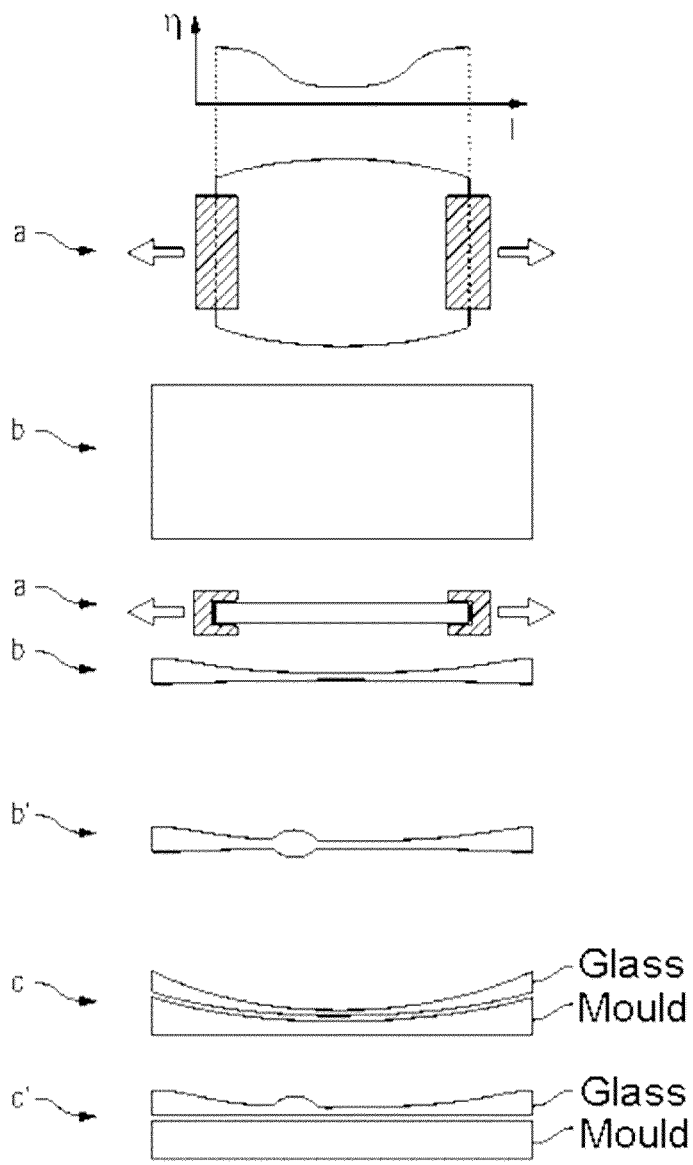
Figure 14A:
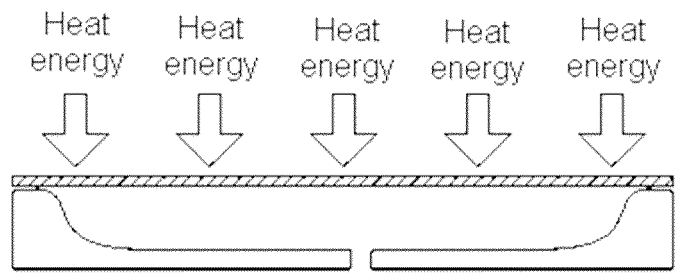
Figure 14B:
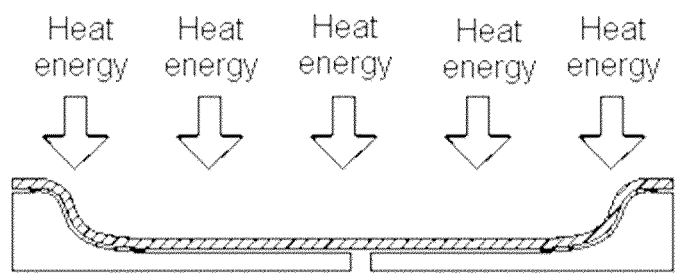
Figure 14C:
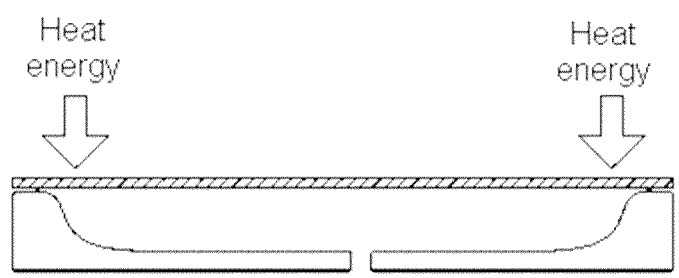
Figure 14D:
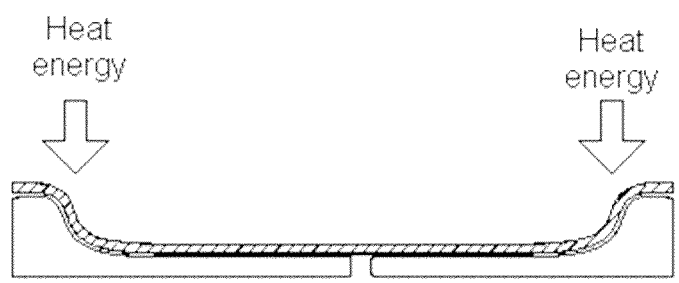
Figure 15A:
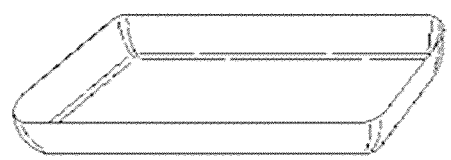
Figure 15B:
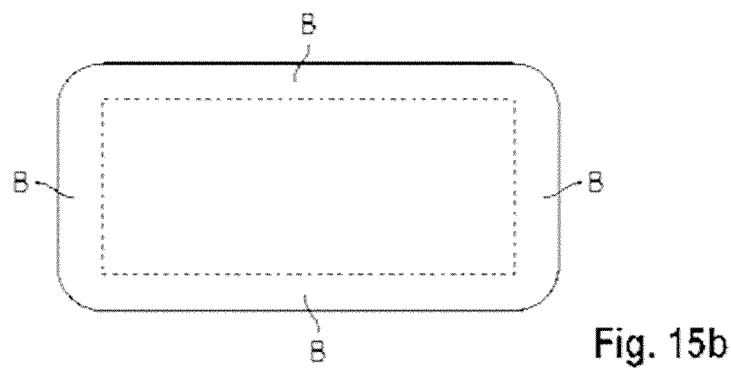
Figure 15C:
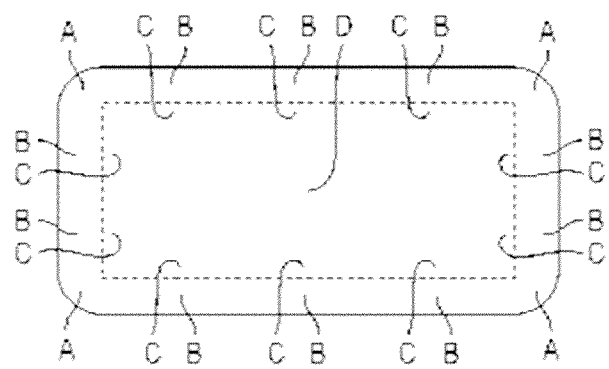
Figure 18:
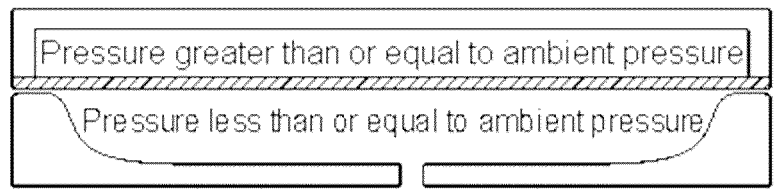
Figure 19:
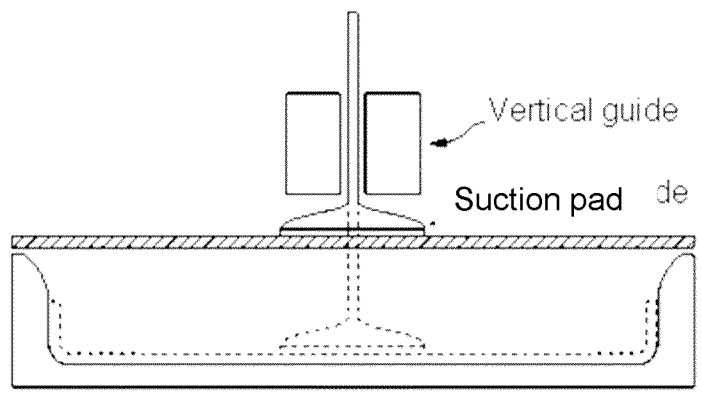

FIG. 13: adjustment of a thickness distribution before bending of a glass pane FIG. 14: defined temperature distribution over the surface of a glass pane before deformation FIG. 15: exemplary embodiment FIG. 16: exemplary embodiment FIG. 17: exemplary embodiment FIG. 18: exemplary embodiment of the use of excess pressure FIG. 19: exemplary embodiment FIG. 20: typical force-displacement diagram It is an advantage of the positive moulds, in contrast to the teaching of US 2010/0000259 A1, that it is simply necessary to grind down the bottom, small deformed surfaces as far as the side surfaces, and the finished, deformed glass part is then obtained. If many of the positive mould impressions are then made on a large glass plate, it is possible, in one deformation step, to produce many deformed glass parts, which can also be separated all at once in a subsequent grinding or severing step. Instead of the positive mould, it is also possible to use movable plungers, which are extended upwards from the plane of the moulds after the glass has been heated. The plunger can thus also be retracted again after the deformation, and therefore it is possible to avoid shrinkage of the glass onto the plunger. This is dependent on the temperature. It is therefore necessary for deformation to take place, in the case of positive moulds, in the region of $Tg=10^{14}$ dPas above or below, i.e. a difference of less than 400 K. In addition, the glass plate is held in position at least during the deformation by vacuum. If required, the vacuum can also be applied before and/or after the deformation.

A combination of vacuum thermoforming and subsequent or simultaneous pressing with short-wave IR radiation is also not yet known. For this purpose, it might be possible to use e.g. quartz glass pressing tools—these are permeable to IR radiation, and therefore heating and pressing can be carried out at the same time. In this case, any type of degree of deformation right up to high degrees of deformation with radii of less than 10 mm is possible. This means that the glass is heated to temperatures in the region of the softening point, deformation is then carried out in part via gravity or vacuum and the final geometry is then formed at the same time or subsequently by means of a pressing tool, wherein the pressing tool may be either highly IR-reflective or highly permeable to IR, and therefore energy can additionally be supplied to the glass during the pressing operation in order to be able to maintain a low viscosity of the glass during the deformation operation, which leads to a high dimensional accuracy and high degrees of deformation.

A high degree of deformation always means small radii of less than 100 mm to less than 1 mm.

Highly permeable to IR means at least 50% transmission in the wavelength range of interest.

Softening point=$10^{7.6}$ dPas.

Highly IR-reflective means at least 50% reflection or scattering in the wavelength range of interest.

The process can be employed for all types of glasses, glass-ceramics, starting glasses for glass-ceramics, optoceramics, plastics and all other types of thermoplastic materials which partially absorb the electromagnetic radiation in the wavelength range of interest.

Suitable radiation sources are all radiation sources in the UV range (e.g. mercury vapour lamps), visible range (e.g. xenon short-arc lamps), IR range (e.g. tungsten-halogen radiators), microwave range (e.g. magnetron), since the process can be modified accordingly for these radiation sources and wavelength ranges.

Radiation always means electromagnetic radiation in the wavelength range of interest.

If short-wave IR radiation does not work, the process can accordingly be modified and used for other suitable wavelength ranges.

EXAMPLE

Deformation of Thin Sheet Glass (LAS 80) with SWIR Radiation

Installation: SWIR Surface Heating Unit with Permanent Air Cooling

The aim of the tests is to test the principles of gravity deformation of glass LAS 80, having a thickness of 0.5 mm-1.0 mm, in 2D and 3D moulds with SWIR technology on Quarzal moulds.

Unit [type]: SWIR surface heating unit (Quarzal walls)
Dimensioning w×d×h [mm]: 300×300×300 (internal dimensions from wall to wall)
Wall material [type]: Quarzal N on all sides
Heat insulation [type]: none
Radiator design: short-wave IR radiator
Radiator arrangement: under the ceiling surface, parallel to the width of the unit
Number of radiators [quantity]: 10
Power [kW]: 10
Colour temperature [K]: 3000
Details/remarks: The radiators are separated from the heating chamber by a quartz glass plate having a thickness of 5 mm. Cooling air is supplied to this radiator chamber.
SWIR Unit with Quarzal Walls (FIG. 5)

The surface heating unit has SWIR high-power radiators installed under the ceiling, which are separated from the rest of the heating chamber by two quartz glass plates connected according to the tongue/groove principle. The quartz glass plates with d=5 mm are uncoated and are made of natural, depleted-water quartz glass. Air is blown into the radiator chamber via slots in the ceiling which run parallel to the radiators. The exhaust air is connected above a collector via two lateral slots underneath the ends of the radiators, the exhaust air being blown into the central process waste air.

The sample plate is positioned on various Quarzal moulds in the centre of the unit.

The temperature of the sample plates is measured using a pyrometer, measurement range 0-2500° C. (emission coefficient: 0.97).

Performance of the Tests:

In the first 4 tests (V01 to V04), the sample, as can be seen in FIG. 6, was positioned on a curved Quarzal plate. The distance to the radiators is 200 mm. The unit was closed on all sides. The samples are then heated at various powers. After a short cooling time, the sample was removed at about 300° C. and the next test was started.

In the next tests (V05 to V09), the sample (FIG. 7) was positioned on a portion of a Quarzal pane (270×75×65 mm), which is likewise in the middle of the unit. The distance to the radiators in this case is 250 mm. The rest of the performance of the tests remains the same.

In the last tests (V10 to V11), the sample (FIG. 8) was positioned on a Quarzal block lying on 2 Quarzal bars (90× 50×30 mm×mm×mm). The distance in this case to the radiators is 240 mm. The structure is again situated in the middle of the unit and the rest of the performance of the tests remains the same.

Results:

TABLE 1

| Test no. | Sample substrate | Sample description | Desired programme | Result |
|---|---|---|---|---|
| V01 | FIG. 6 Quarzal mould is cold | LAS 80 100 × 70 × 1.00 mm$^3$ | Step to 600° C., hold for 1 minute, step to RT | Pane is shaped |
| V02 | FIG. 6 Quarzal mould is warm | LAS 80 100 × 70 × 0.70 mm$^3$ | Step to 600° C., hold for 1 minute, step to RT | Pane is shaped |
| V03 | FIG. 6 Quarzal mould is warm | LAS 80 100 × 70 × 0.55 mm$^3$ | Step to 600° C., hold for 1 minute, step to RT | Pane is shaped |
| V04 | FIG. 6 Quarzal mould is warm | LAS 80 100 × 70 × 1.00 mm$^3$ | Step to 600° C., hold for 1 minute, step to RT | Pane is shaped |
| V05 | FIG. 7 Quarzal mould is cold | LAS 80 100 × 70 × 0.55 mm$^3$ | Step to 600° C., hold for 1 minute, step to RT | Pane is not shaped |
| V06 | FIG. 7 Quarzal mould now preheated | LAS 80 100 × 70 × 0.55 mm$^3$ | Step to 600° C., hold for 1 minute, step to RT | Pane is not shaped |
| V07 | FIG. 7 Quarzal mould is warm | LAS 80 100 × 70 × 0.55 mm$^3$ | Step to 650° C., hold for 1 minute, step to RT | Pane is almost shaped |
| V08 | FIG. 7 Quarzal mould is warm | LAS 80 100 × 70 × 0.55 mm$^3$ | Step to 660° C., hold for 1.5 minutes, step to RT | Pane is not completely shaped, forms folds |
| V09 | FIG. 7 Quarzal mould is warm | LAS 80 100 × 70 × 1.00 mm$^3$ | Step to 660° C., hold for 1.5 minutes, step to RT | Pane is well shaped, with a fold in the centre |
| V10 | FIG. 8 Quarzal mould is cold | LAS 80 100 × 70 × 0.70 mm$^3$ | Step to 650° C., hold for 1.5 minutes, step to RT | Pane is shaped |
| V11 | FIG. 8 Quarzal mould is warm | LAS 80 100 × 70 × 0.70 mm$^3$ | Step to 650° C., hold for 1.5 minutes, step to RT | Pane is shaped, but with folds |

Conclusion, Additional Remarks:

In the first tests, it was possible for the deformation of glass LAS 80 having the thicknesses of 0.5 mm-1.0 mm to be carried out without problems by means of gravity.

II. Process 3 (Scoring, Folding and Edge Melting: "Origami")

Folds are formed during the deformation of glass, in particular, in the case of the shaping of 3-dimensional deformations, at those points at which 2 or more radii of curvature with non-parallel bending axes meet one another. In the case of a box-like half-shell geometry, this is the case particularly at the corners. Similarly to the folding of paper, the circumferential length of the edge is shortened upon folding back at all points at which radii occur. The excess circumferential length is collected in folds.

One way of preventing the formation of folds is to stretch or thin the glass during shaping, as is the case in thermoforming with the use of vacuum (see above).

A further possibility is to proceed as follows:

Approximated conceptually, the desired three-dimensional surface contour is a suitable contour having, at the rounded corners, edges which can be cut by suitable incisions (along the lines X) such that a developable surface is produced.

A planar glass part, e.g. a piece of flat glass with a uniform thickness, is cut to size in precisely this substantially planar contour and its edges are each bent such that the conceptually formed approximate contour is produced substantially by uniaxial bending with at most a small 3D component. The abutting edges/interfaces are then softened at a temperature such that they melt into one another and, if necessary, obtain the desired bending contour under the influence of the surface tension or, if appropriate, further shaping aids. By way of example, this can be achieved (on the left of the figure) by virtue of the fact that the corners are softened using a burner, whereas the adjoining edges are held by a, possibly cooled, mould.

It is an advantage of this process that, despite very complex 3D deformations with a plurality of interlocking radii, the formation of folds can be avoided, without the thickness distribution (and therefore the achievable strength) being changed very considerably, owing to stretching or compression of the glass, compared to the starting flat glass.

III. Adjustment of a Thickness Distribution Before Deformation (According to Dependent Claim 5)

A particular challenge during the production of shaped parts made of glass, which are intended to serve as parts of a housing or display, is presented by parts intended to have a greatly variable wall thickness. This can only be realized to a greatly limited extent by a pure sinking process, be it also in combination with vacuum, pressure or an upper plunger, or results automatically and in a barely influenceable manner as thinning or compression resulting from the deformation.

A pressing process similar to the blank pressing process conventional in the case of lenses, at viscosities of 109 to 1011 dPas viscosity, is possible but complex here, since long lateral flow paths for the glass are required, which demand long pressing times and can only be achieved with difficulty along with a good surface quality.

An advantageous approach to obtaining a defined thickness distribution, which can be carried out completely without the risk of damaging the surface, is the following:

In the glass part to be shaped, a temperature and viscosity (eta) distribution is generated, in which regions which are to have a smaller wall thickness in the product have a lower viscosity than those regions which are to have a larger wall thickness.

The glass part, the temperature of which is set in this way, is stretched in one or more directions, e.g. by clamps or grippers which act on the edge and move away from the midpoint of the surface of the starting glass.

As a result, those regions with the lower viscosity are stretched and therefore thinned to a greater extent than those regions at the higher temperature.

The result of this preliminary process is a glass part with a variable thickness, which has a substantially planar geometry and thus serves as a starting point for one of the conventional deformation processes, or one of the deformation processes described in this application. As a result, a glass part is ultimately produced which desirably has both a thickness distribution and also a corresponding, generally 3-dimensional surface contour. Examples b') and c') in the adjacent figure show a very pronounced thickness distribution. A subsequent shaping process may serve to set a defined surface curvature (c), or else also to shape a surface such that it is planar again (cc).

IV. Defined Temperature Distribution Over the Surface of the Starting Glass During Bending (According to Dependent Claim 6)

The standard production is the substantially homogeneous heating of the starting glass (e.g. using electrical radiators, burners or any other desired heat sources) and the sinking into a mould under the influence of gravity of the glass and possibly additional shaping forces, e.g. a negative pressure between the glass and the mould which can be applied by one or more (suction) openings in the mould.

In the case of narrow radii to be shaped (e.g. bending radii of less than 15 mm, less than 10 mm, in particular also bending radii of less than 8 mm or 5 mm, e.g. 3 mm), in particular in corners at which bending radii simultaneously exist in various spatial directions (3-dimensional contour), such a process can have the disadvantage that very high temperatures are required to shape these narrow radii (e.g. temperatures above the so-called softening point of the glass in question, which lies at a viscosity of about 107 dPas, preferably temperatures at which the glass lies at viscosities in the range of 105 dPas to 103 dPas). At these temperatures, however, the risk of defects occurring in surfaces in contact with the mould is particularly great.

A conscious adjustment of a low mould temperature, e.g. of more than 30 K, more than 50 K or 100 K or more than 200 K below the glass temperature, in any case below the temperature at which the glass has a viscosity of $10^9$ dPas, preferably of $10^{19}$ dPas, is a possible remedy in this respect and reduces the surface defects.

The formation of such surface defects can be prevented even more effectively by heating the glass not homogeneously but instead preferably in those regions in which deformation is to be carried out. Even regions in which no or only a small degree of shaping (e.g. with bending radii of more than 50 mm, or more than 100 mm in the case of glass having a thickness of less than 2.5 mm) is to be carried out, heating is preferably carried out to a temperature at which the glass has a viscosity in the range of $10^{13}$ dPas to $10^9$ dPas, in order firstly to reduce the formation of stresses and secondly to prevent the formation of defects in the surface in contact with the mould. In contrast, regions having narrow radii to be shaped (e.g. bending radii of less than 15 mm, less than 10 mm, in particular also bending radii of less than 8 mm or 5 mm, e.g. 3 mm), in particular in corners at which bending radii simultaneously exist in various spatial directions (3-dimensional contour), are heated to higher temperatures (e.g. temperatures at which the glass has a viscosity of less than $10^{10}$ dPas, preferably less than $10^7$ dPas, particularly preferably temperatures at which the glass has a viscosity in the range of $10^5$ dPas to $10^3$ dPas). The distinguishing feature of the process here is not so much the specific temperatures, but rather the fact that the viscosities set differ at least by a factor of 100 between the hottest and the coldest part over the glass part to be shaped.

In those regions of the glass in which a greatly three-dimensional contour is to be shaped, it is also necessary in particular to prevent the formation of folds in the glass during shaping, e.g. in the case of contours such as in FIG. 15 at the points A. In this case, it is possible for a plurality of radii each measuring less than 15 mm, less than 10 mm or even less than 5 mm to meet three-dimensionally. This is the case particularly when the depicted contour is to be shaped not by thermoforming (and therefore stretching) from a flat glass, but instead by bending up the edges B analogously to the following figure. Specifically, in this case there is excess glass in the corners which, after the bending, should produce the regions A of the product; this excess glass, if it should not lead to the formation of folds, has to be deposited in an increase in the glass thickness in the regions A. This has the advantage that the strength of these regions, which are particularly sensitive to fracture, is also increased to a particular extent owing to the increased glass thickness.

In order to nevertheless ensure that the glass actually leads to a thickening of the wall and not to the formation of folds during the bending up of the regions B into regions A to be shaped, the glass has to be sufficiently soft at these points. The glass should preferably be so soft that the surface tension forces acting in the glass convert the glass mass in the corners into a thickened portion so quickly that no folds are created. The viscosity required for this purpose is, of course, dependent on the desired deformation rate. In general, however, it should suffice to heat the corner regions to a viscosity of less than $10^7$ dPas, preferably less than $10^5$ dPas, particularly preferably of $10^4$ dPas or less. In combination with that stated above, a particularly preferred temperature distribution in the starting glass to be shaped is shown by way of example in the adjacent figure, and therefore the regions A have a viscosity in the range of $10^3$ to $10^6$ dPas, the regions C have a viscosity in the range of $10^4$ to $10^9$ dPas and the regions D have a viscosity in the range of $10^9$ to $10^{13}$ dPas.

The bending of the regions B thereby creates a thickened portion in the corner region, which is shown schematically in the adjacent figure.

A particularly advantageous embodiment is that the bending mould only comes into contact with the shape in regions B and D, in which the viscosity is substantially above $10^9$ dPas, and has recesses A in particular in the hotter regions C, however, and therefore the contour is shaped freely.

In another embodiment (FIG. 17), shaping jaws protrude from the initially planar contact surface.

The exemplary geometry chosen relates to a shape which, by way of example, would be suitable as a back cover for electronic appliances, and this is why the shaped glass is advantageously also chemically tempered after the shaping.

It goes without saying that said approaches for selecting an appropriate temperature distribution in the starting glass can also be used correspondingly for any other desired geometry.

Here, the temperature distribution can be adjusted, by way of example, using commercially available burners of a suitable size, using lasers which are suitably controlled and scanned or else using, by way of example, any planar heating method using appropriate masks which shadow parts of the starting glass. One particular embodiment is one whereby the temperature of the starting glass which has not yet been completely cooled by the primary shaping, i.e. generally a glass ribbon, is suitably set by suitable local cooling or a combination of heating and cooling. The shaping itself can be performed merely under the action of gravity, with the aid of negative pressure or vacuum between the mould and the glass, or else also by the application of excess pressure, which presses the glass into the mould. In this case, the application of excess pressure is not restricted to a pressure difference of 1 bar effective on the glass. When shaping small radii, this can also be advantageous at low temperatures for obtaining a good surface.

It is thereby also possible to shape radii of less than 10 mm and less than 5 mm, even at viscosities of more than $10^9$ dPas, even more than $10^{10}$ dPas, by applying excess pressure and given a resulting pressure difference between the two surfaces of the starting glass of more than 1 bar.

An exemplary embodiment relating to the application of excess pressure is shown in FIG. 18.

A particularly simple realization example is represented by the following procedure:
1. a starting glass pane is positioned on a mould substrate which substantially has the geometry and dimensions of the base to be shaped flat,
2. the temperature distribution discussed is applied to the starting glass,
3. the edges are allowed to fold downwards under the action of gravity.

It is self-evident to a person skilled in the art that the advantages of the temperature distributions described above can also be utilized advantageously for any type of pressing process, for example also variations of the blank pressing process, in particular in order to make regions with small degrees of deformation owing to a locally lower temperature less sensitive to surface damage.

In order to avoid an excess of glass, which has to be removed (e.g. cut off) after the bending, it is advantageous to dimension the cutting of the starting glass such that the edge also slips into the bending mould. A difficulty which may arise in this respect is that in such bending processes glass plates often tend to slip to an unequal depth, i.e. askew, into the mould. In order to avoid this, a vertical guide can be attached to the glass in a particularly simple manner, e.g. using a small suction pad which acts in the centre of the glass, which is at a viscosity of $>10^{10}$ dPas and is therefore less sensitive to surface damage. This pad may itself be guided vertically and thus prevent lateral slipping of the glass (see FIG. 19).

V. Process 4 (Special Blowing Process)

A specific embodiment in relation to the application of excess pressure is a modification of a conventional blowing process. Here, the appropriately thin starting glass is obtained by the usual techniques conventional in the container glass industry for producing a hollow ware parison.

However, said glass parison is introduced into a finish blow mould and provided with an internal pressure, the wall of the finish blow mould containing those regions which correspond positively or negatively to the desired product contour. The regions of this type are advantageously placed adjacent to one another as tightly as possible and arranged such that the cross section of the resulting mould wall is as close as possible to a circular cross section, so that the parison, which is naturally rotationally symmetrical owing to the homogeneous internal pressure, fits said mould as well as possible.

Particularly when employing a pressing/blowing process, the pressing step can also be used, however, to generate a desired, non-rotationally symmetrical thickness distribution of the parison, in order to bring about an appropriate change in the thickness distribution in the product. By way of example, it may thus be desirable for the centre of the surface to have thicker or else thinner wall thicknesses compared to the edges of the product.

The finish blow mould produces a hollow ware part which contains the desired end product at least once, but particularly preferably four times or more frequently. Suitable separation according to generally known processes provides the corresponding individual glass parts.

It is an advantage of this process that it ties in with the common and very economical blowing process, as is conventional in the container glass industry and is also possible for types of glass which cannot be readily produced using the conventional flat glass production processes, for example floating, or via drawing processes.

VI. Process 5 ("Clicker Frog Effect")

This is the approach for touch panels in order to achieve tactile feedback of the glass surface when it is pressed, similar to high-quality, conventional keyboards or to membrane keyboards.

The tactile effect can be provided either in the form of locally structured elements (keys) or else globally on the touch panel.

According to the prior art, it is conventional to chemically temper both smooth surfaces of the glass pane (i.e. the upper side and lower side thereof) tangentially to the surface thereof virtually homogeneously, but greatly inhomogeneously in the normal direction, by the exchange of ions in the glass matrix. Owing to this procedure, both surfaces are offset to the same extent under compressive stress, in order for example to make it harder for hard, pointed bodies to penetrate (making it harder for surface defects to occur).

If, however, the ion exchange takes place in a locally structured manner and to a different extent on one and/or both of the surfaces (upper side and rear side), the 2D distribution of the compressive stress can be varied locally in the case of thin glass (thickness about 0.5 mm), and a locally variable membrane stress can therefore be built up.

In a manner similar to the membrane keyboards of organic plastics, a force-displacement behaviour with hysteresis is thereby obtained (cf. clicker frog).

A typical force-displacement diagram has the appearance shown in FIG. 20.

A snap switch is an electrical switch whose force-displacement characteristic shows a pronounced hysteresis. Here, the haptics are similar to those in the case of the children's toy called clicker frog.

The invention claimed is:

1. A process for producing a shaped glass article with a defined geometry, the process comprising:
   arranging a glass pane on a mould;
   heterogeneously heating the glass pane in a heating unit to form a heated glass pane that has corner regions heated to a viscosity of less than $10^4$ dPas;
   deforming the heated glass pane over the mould by a force selected from the group consisting of gravity, negative pressure, excess pressure, and combinations thereof to form a shaped glass pane; and
   cooling the shaped glass pane to obtain the shaped glass article with the defined geometry.

2. The process according to claim 1, wherein the step of heterogeneously heating the glass pane comprises heating by infrared radiation in the heating unit.

3. The process according to claim 2, wherein the infrared radiation comprises short-wave infrared radiation or medium-wave infrared radiation.

4. The process according to claim 1, further comprising heating at least one inner wall of the heating unit to a temperature that is higher than a temperature of the heated glass pane.

5. The process according to claim 1, further comprising shadowing parts of the glass pane with a planar heating mask during the heating step.

6. The process according to claim 1, further comprising heating regions of the glass pane in which no or only a small degree of shaping is to be carried out to a temperature at which the glass has a viscosity in the range of $10^{13}$ dPas to $10^9$ dPas.

7. The process according to claim 1, wherein the heating the glass pane comprises heating so that the glass has a viscosity that differs at least by a factor of 100 between the corner regions of the glass pane and a coldest part of the glass pane.

8. The process according to claim 1, wherein the heating comprises using burners of a suitable size or lasers that are suitably controlled or scanned.

9. The process according to claim 1, wherein the glass pane has a predefined thickness distribution.

10. The process according to claim 1, wherein, during the deforming of the heated glass pane, the mould has a temperature in the range of 250° C.-800° C.

11. The process according to claim 1, wherein, during the deforming of the heated glass pane, a temperature difference above 250 K between the mould and the heated glass pane is present.

12. The process according to claim 1, wherein the shaped glass article comprises a shaped region having a narrow radii of less than 50 mm and a surface quality with less than 1 defect measuring greater than 50 μm per 1 cm² in the shaped region.

13. The process according to claim 12, wherein the narrow radii is less than 15 mm.

14. The process according to claim 12, wherein the surface quality has less than 1 defect measuring greater than 50 μm per 10 cm².

15. The process according to claim 12, wherein the surface quality has less than 1 defect measuring greater than 50 μm per 100 cm².

16. The process according to claim 12, further comprising folds and/or surface undulations that account for at most +/−10% of a thickness of the glass pane.

17. The process according to claim 12, further comprising folds and/or surface undulations that account for at most +/−5% of a thickness of the glass pane.

18. The process according to claim 12, further comprising configuring the shaped glass article for use as a device selected from the group consisting part of a screen, part of a housing of electrical or of electronic appliances, part of a housing of mobile telephones, part of a housing of computers, and part of a housing of games consoles.

19. A process for producing a shaped glass article with a defined geometry, the process comprising:
arranging a glass pane on a mould;
heterogeneously heating the glass pane in a heating unit to form a heated glass pane that has corner regions heated to a viscosity of less than $10^4$ dPas and so that the glass has a viscosity that differs at least by a factor of 100 between the corner regions and a coldest part of the heated glass pane;
deforming the heated glass pane over the mould so that surface tension forces acting in the glass convert glass mass in the corner regions into a thickened portion with folds and/or surface undulations that account for at most +/−10% of a thickness of the glass pane; and
cooling the glass pane to obtain the shaped glass article with the defined geometry.

20. The process according to claim 19, wherein, during the deforming of the heated glass pane, the mould has a temperature in the range of 250° C.-800° C.

* * * * *